United States Patent [19]
Scheffler, Jr.

[11] 3,848,635
[45] Nov. 19, 1974

[54] FLUID DISTRIBUTOR APPARATUS

[75] Inventor: Edward D. Scheffler, Jr., Coloma, Mich.

[73] Assignee: AG Tec Inc., Indianapolis, Ind.

[22] Filed: Feb. 26, 1973

[21] Appl. No.: 336,017

[52] U.S. Cl................. 137/610, 239/77, 239/127, 239/553.5
[51] Int. Cl............................................ A01h 17/08
[58] Field of Search....... 239/127, 77, 78, 552, 443, 239/444, 445, 553, 553.5; 137/610

[56] References Cited
UNITED STATES PATENTS

| | | | |
|---|---|---|---|
| 3,174,652 | 3/1965 | Villemure | 239/552 X |
| 3,342,198 | 9/1967 | Groeber | 137/610 X |
| 3,363,843 | 1/1968 | Ballard et al. | 239/552 X |
| 3,504,854 | 4/1970 | De Kinkelder | 239/78 |
| 3,605,811 | 9/1971 | Lovell | 137/610 X |

Primary Examiner—M. Henson Wood, Jr.
Assistant Examiner—Michael Mar
Attorney, Agent, or Firm—Woodard, Weikart, Emhardt & Naughton

[57] ABSTRACT

An orchard spraying vehicle is provided with a plurality of spray nozzles, discharging liquid into an air blast whereby it is carried onto foliage. Nozzles are provided with liquid from distributor cylinders, each cylinder having four chambers therein, each chamber serving a nozzle. The distributor cylinder inlet can be offset with respect to a junction of the chamber defining walls, to obtain the desired proportion of incoming liquid which will be provided to the respective nozzles. Each of two distributing cylinders is supplied from a flow divider supplied by a pump through an adjustable metering valve.

7 Claims, 6 Drawing Figures

FLUID DISTRIBUTOR APPARATUS

BACKGROUND OF THE INVENTION

1. Field of the Invention

This invention relates generally to spraying apparatus for agricultural use, and more particularly to apparatus for distributing liquids to the desired discharge devices.

2. Description of the Prior Art

Many sizes and types of agricultural spraying machines have been devised and employed commercially. I believe that typically they use manually adjustable valves of conventional construction to control flow of the liquid to be sprayed. In my opinion it is desirable not only to be able to control the quantity of liquid being sprayed, but also to control the proportion of the sprayed liquid which is discharged at different angles from the spraying machine. To accomplish this, I prefer to discharge different percentages of the total amount of liquid being discharged, at different angles, and thus have devised a method and apparatus for doing so. Although various types of liquid distributing devices are shown in the following list of patents, none of them possesses all of the features which I seek, particularly with reference to reliability, versatility, and convenience in use. The prior art patents at hand, and dealing generally with flow dividers are as follows:

| 828,086 | Bowers | August 7, 1906 |
| 2,912,994 | Mori | November 17, 1959 |
| 3,194,264 | Greco | July 13, 1965 |
| 3,202,170 | Holbrook | August 24, 1965 |
| 3,223,122 | Banker | December 14, 1965 |
| 3,391,711 | Wade | July 9, 1968 |

Australian Pat. No. 115,513, issued July 23, 1942 to Melrose et al.

Other prior art patents at hand and dealing with proportional devices are as follows:

| 1,102,354 | Pougnet | July 7, 1914 |
| 1,317,762 | Shafer, Jr. | October 7, 1919 |
| 2,034,515 | Hubbell | March 17, 1936 |
| 2,236,182 | Meersmans | March 25, 1941 |
| 2,527,950 | Maness | October 31, 1950 |
| 2,619,388 | Wahlin | November 25, 1952 |
| 2,720,889 | Gothberg | October 18, 1955 |
| 2,814,526 | Blair | November 26, 1957 |

SUMMARY OF THE INVENTION

Described briefly, in a typical embodiment of the present invention, nozzles disposed in an array in an air discharge device, are supplied by distributing means including a body having an inlet from a supply and a flow splitter immediately downstream of the inlet and a means for providing relative change of position of the flow splitter with respect to the inlet. The supply to the inlet is provided from a pump through an adjustable metering device to control total available flow, and then through a flow divider supplying two of the distributing means and adjustable to change the proportions between that flowing to the one distributor and that flowing to the other distributor.

DESCRIPTION OF THE PREFERRED EMBODIMENT

Figure 1:
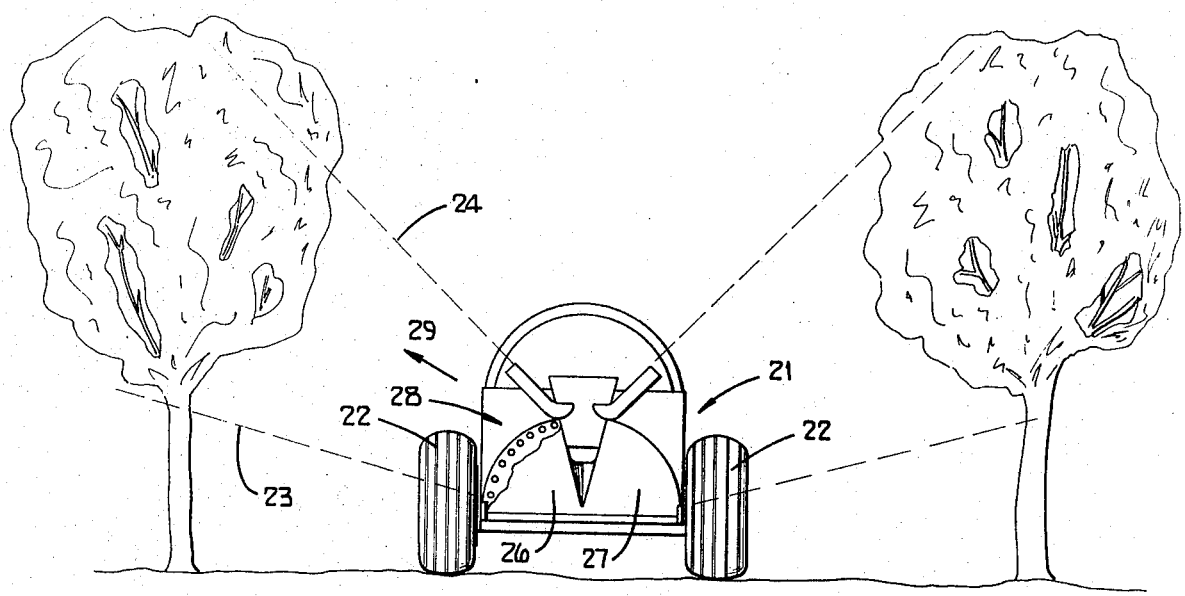
FIG. 1 is a rear end view of an orchard sprayer incorporating thereon a typical embodiment of the present invention.

Referring now to the drawings in detail, FIG. 1 is a rear end view of a spraying machine 21 having a pair of wheels 22, one at each side, and facilitating forward movement of the machine as it discharges a mixture of air and insecticide or fungicide, for example, onto the foliage. An air discharge duct and nozzle 26 is provided on the left-hand side of the machine for directing air outwardly and upwardly in the sector included between lower line 23 and upper line 24 and transverse to the direction of movement of the machine. A similar air duct and nozzle 27 is provided at the right-hand side of the machine. These ducts and nozzles may have some similarity to those in a U.S. Pat. No. 3,504,854 to DeKinkelder, but in contrast to DeKinkelder, are preferably co-planar, i.e., side-by-side, rather than staggered.

There is an array of eight liquid-dispensing nozzles designated generally by reference numeral 28 and disposed in an arc between the line 23 and line 24 for dispensing liquid into the air blast directed outwardly generally in the direction of arrow 29 from nozzle 26.

Figure 2:
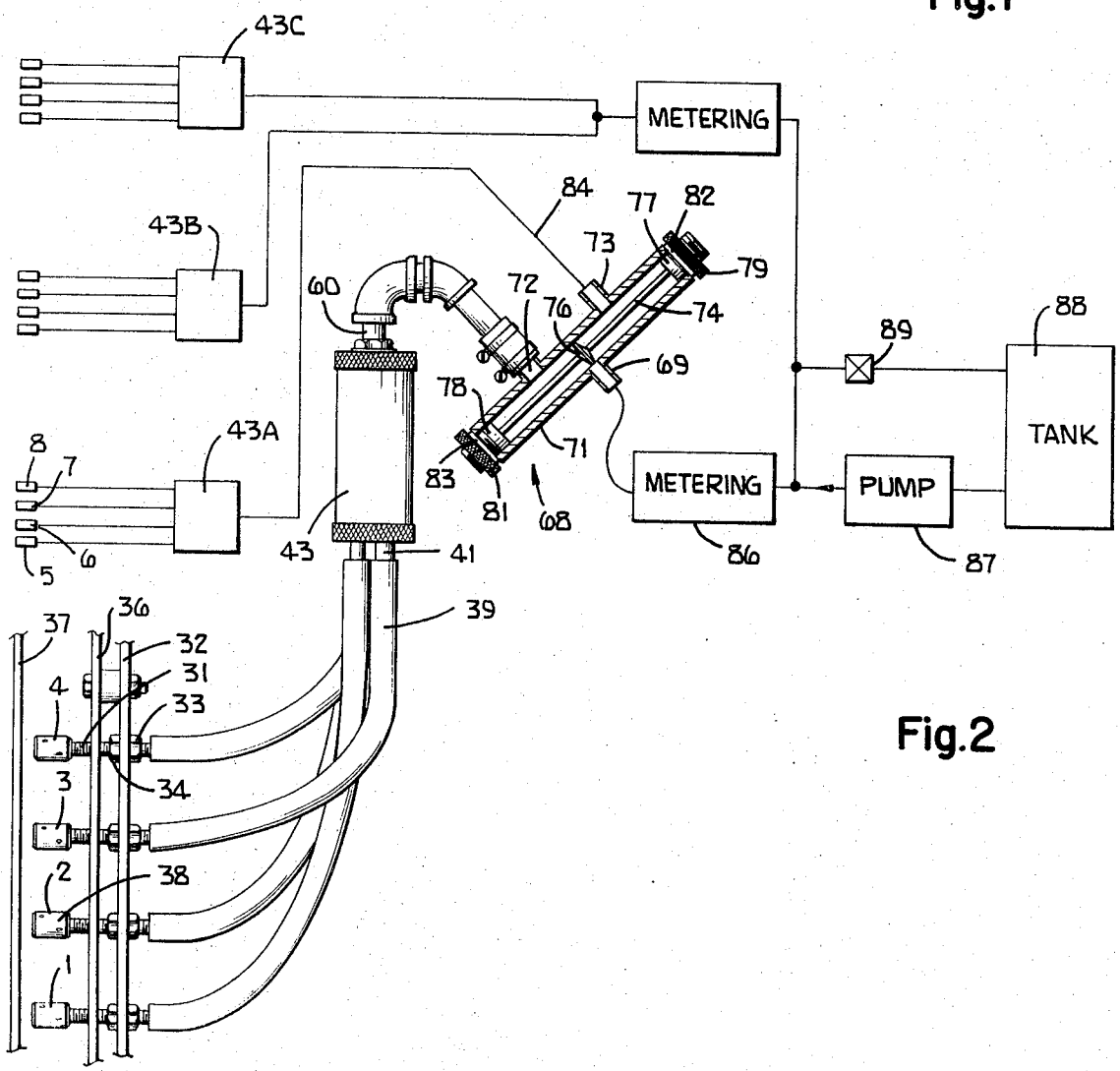
FIG. 2 is a partially pictorial and partially schematic diagram of the liquid distributing apparatus according to a typical embodiment of the present invention.

As is best shown in FIG. 2, each nozzle may be a pipe nipple 31 secured in a nozzle mounting ring 32 by means of a couple of nuts 33 and 34 threadedly received on the pipe nipple on opposite sides of the mounting ring. The pipe nipple 31 extends through the front wall 36 of the air nozzle and terminates between the front wall 36 and rear wall 37 of the air nozzle. A multi-apertured tip 38 may be threadedly secured on the end of the nipple 31 and may be useful to facilitate break-up of liquid particles by the air blast issuing from the nozzle.

Further referring to FIG. 2, the four liquid nozzles provided in the air nozzle 26 are identified by reference numerals 1 through 8. Referring specifically to nozzles 1 through 4, it can be seen that each of these is provided with a supply of liquid through a separate one of four hoses such as hose 39 connected to a tube 41 affixed in a base plug (42 in FIG. 3) of a distributor cylinder 43. There are four of these distributor cylinders, the other three each serving four liquid discharge nozzles, cylinder 43A serving nozzles 5 through 8 on the left-hand side, cylinder 43B serving the lower four nozzles on the right-hand side of the machine in the air nozzle 27, and cylinder 43C serving the upper four liquid discharge nozzles in the air nozzle 27 at the right-hand side of the machine.

Figure 3:
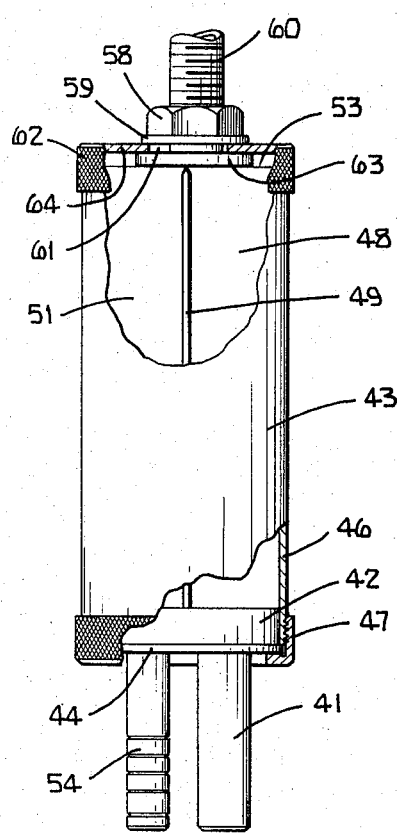
FIG. 3 is an enlarged elevational view of the distributing cylinder according to a typical embodiment, with a portion broken away to show the offset relationship between the inlet fitting and the passageway walls therein.
Figure 4:
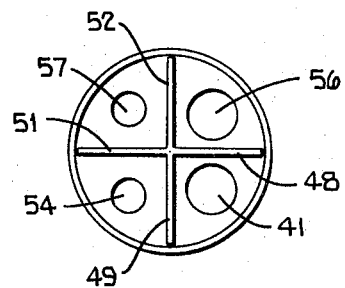
FIG. 4 is a top plan view of the distributing cylinder with the cover cap removed.

As is best shown in FIGS. 3 and 4, the plug 42 at the bottom of distributor cylinder 43 is provided with an outwardly extending circular flange 44 abutting engaging the lower edge of the cylinder wall 46. It is secured in place by the ring 47 threadedly received on the lower end of the cylinder wall 46.

Plug 42 has four plates 48, 49, 51, and 52 secured thereto and extending upwardly therefrom to upper edges such as edge 53 for plate 48. As shown, these plates meet each other along a line co-linear with the cylindrical axis of the cylinder, and each plate extends radially outward from that line to appoint immediately adjacent the inner wall of the cylinder 46. Thus it divides the cylinder into four chambers or passageways. The outlet fitting 41 communicates with one of these passageways, outlet fitting 54 communicates with another and outlet fittings 56 and 57 (FIG. 4) communicate with the two other passageways. The inlet to these passageways is provided through the pipe fitting 60 which extends through the locknut 58, washer 59 and aperture 61 in the cap 62 and opens in the center of the radially outwardly extending flange 63. Typically this flange 63 is circular and is of a diameter sufficiently great that even when it is in its maximum offset position with respect to the central axis of the cylinder and aperture 61, it still will provide a seal against the inside face 64 of the cap 62.

Figure 5:
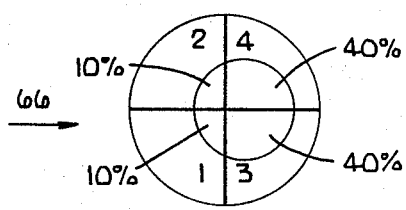
FIG. 5 is a schematic diagram showing one example of positioning of the inlet with respect to the splitter edges for a certain desired proportioning of the flow.
Figure 6:
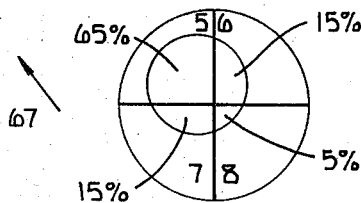
FIG. 6 is another schematic view similar to 5 but showing another relative position of the inlet to the splitter edges for proportioning the flow.

The purpose of having the aperture 61 larger than the outside diameter of the fitting 60, is to impliment a feature of the present invention which is to enable splitting the flow from the inlet into the proportions desired at the various outlets to serve the various nozzles. For example, as illustrated in FIG. 5, if it is desired to provide each of nozzles 1 and 2 with ten percent of the flow, and each of the nozzles 3 and 4 with forty percent of the flow, the inlet fitting is offset from the axis of the distributor in the direction of arrow 66 in an amount such that the upper leading edges such as 53 of the four blades or walls defining the passageways, split the flow in these proportions. Another possible adjustment is illustrated in FIG. 6 where the inlet fitting is offset in the direction of arrow 67 to provide 5 percent in nozzle 8, 65 percent in nozzle 5, and 15 percent in each of nozzles 6 and 7. Once the desired proportions have been set, by appropriate offsetting of the inlet fitting, the locknut 58 is again tightened to seal the upper face of the flange 63 with the underside of the cap completely around the cap central aperture 61. At the same time the lower face of the flange 63 is immediately adjacent the upper edges of the four splitting walls 48, 49, 51, and 52.

Referring again to FIG. 2, supply to the inlet fitting 60 is provided by suitable pipe connections and a hose connection to a flow divider 68. This flow divider includes an inlet fitting 69 centrally disposed between the ends of the flow divider cylinder 71, and to outlet fittings 72 and 73 are likewise disposed on the cylinder 71.

A valve spool is provided in the center of the tube 71 and includes a rod 74, a disc 76, and externally threaded plugs 77 and 78. All of these may be one integral non-adjustable units. The plugs have lock rings 79 and 81 threadedly received thereon, with seal washers 82 and 83 between the lock rings and the ends of the tube 71. By turning one lock ring clockwise and the other counterclockwise, the disc 76 can be moved parallel to the direction of the axis of the tube so that it is toward the right or the left or on the center line of the fitting 69, whereby the disc 76 which is substantially of the same diameter of the bore of the tube serves to divide the flow into the tube from the fitting 69. If desired, the disc 76 can be moved to close the left-hand end and thus divert all of the flow to the right-hand end and out through the hose 84 to the distributor cylinder 43A. In contrast, if desired, the disc can be moved to the right-hand side of the inlet port from fitting 69, and direct all of the liquid to the distributor cylinder 43.

The metering device 86 is supplied by the pump 87 which obtains liquid from the tank 88. A return by-pass valve 89 can direct the portion of the pump discharge back into the tank to provide a stirring or agitating function in the tank to preclude separating of materials therein.

From the foregoing discription, it will be seen that the present invention makes it possible, by means of the nut 58, to adjust the inlet fitting 60, so that the center of the discharge of fluid therefrom into the cylinder can be offset as desired with respect to the point of intersection of the upper leading edges of the splitter vanes in the cylinder. In this way it can direct liquid to four of the nozzles in the proportions desired for dispensing into the air blast generated by a fan, blower or other type of air mover in the vehicle exhausting through air nozzle 26. The same is true as to the other four nozzles on the left-hand side, and as to the eight liquid dispensing nozzles on the right-hand side in the air discharge nozzle 27.

While the invention has been disclosed and described in some detail in the drawings and foregoing description, they are to be considered as illustrative and not restrictive in character, as other modifications may readily suggest themselves to persons skilled in this art and within the brood scope of the invention.

The invention claimed is:

1. Fluid distributor apparatus comprising:
   a body having a fluid inlet means, a plurality of fluid outlet means, flow splitter means having leading edges intersecting at a point in registry with said inlet means to split the fluid flowing into said body into at least two paths, a different one of said outlet means communicating with each of said paths, the relative location of intersection of said edges with respect to said inlet means being changeable to change the proportions of inlet fluid flowing through the different outlet means.

2. The apparatus of claim 1 wherein:
   said body is a cylinder,
   said fluid inlet means include a first tubular inlet member extending through an aperture in one end wall of said cylinder,
   said splitter means include four longitudinally extending partition walls extending from said leading edges near said one end wall of said cylinder to the opposite end wall of said cylinder, said partition walls meeting each other along a line extending from said point to said opposite end wall, thus providing four passageways in said cylinder,
   said outlet means including four tubular outlet members, each different one of said outlet members communicating with a different one of said passageways through an aperture in said opposite end wall.

3. The apparatus of claim 2 wherein:

said tubular inlet means includes flange means extending radially outward from the opening of said tubular inlet member into said cylinder, said flange means being disposed between said leading edges and said one end wall of said cylinder; and said aperture in said one end wall is larger than the outside maximum cross sectional dimension of said tubular inlet member extending therethrough, whereby said tubular inlet member is shiftable from a position of alignment of its axis with the intersecting point, to various offset relationships of said axis with said point, said flange means having a sufficiently great minimum radial extension from said axis to maintain interior coverage of said aperture in said one end wall when said axis is in its maximum offset condition.

4. The apparatus of claim 3 wherein:
said tubular inlet member is externally threaded,
a lock nut is threadedly received on said inlet member and secures said inlet member in position in said one end wall, said one end wall being gripped between said nut and said flange means, with said flange means being sealed to the inner face of said one end wall around the perimeter of said aperture.

5. The apparatus of claim 4 wherein:
a first cap is threadedly received on said cylinder, providing said one end wall thereof; and
a second cap is threadedly received on said cylinder, providing said opposite end wall thereof.

6. The apparatus of claim 5 wherein:
the meeting line of said walls is colinear with the longitudinal axis of said cylinder.

7. The apparatus of claim 6 wherein:
said cylinder, walls, flange means and tubular inlet member and tubular outlet members are made of brass.

* * * * *